United States Patent [19]

Stump

[11] Patent Number: 4,972,803
[45] Date of Patent: Nov. 27, 1990

[54] METHOD AND APPARATUS FOR COOLING LIVESTOCK

[75] Inventor: Harold R. Stump, Sioux City, Iowa

[73] Assignee: Harann, Inc., Sioux City, Iowa

[21] Appl. No.: 470,367

[22] Filed: Jan. 25, 1990

[51] Int. Cl.$^5$ .............................................. A01K 1/00
[52] U.S. Cl. ................................................... 119/159
[58] Field of Search ........................ 119/7, 158, 159; 239/172; 296/24.2

[56] References Cited

U.S. PATENT DOCUMENTS

| | | |
|---|---|---|
| 237,692 | 2/1881 | Murphey . |
| 2,595,781 | 5/1952 | Durham .............................. 119/159 |
| 2,751,882 | 6/1956 | Coyner ................................... 119/7 |
| 3,949,709 | 4/1976 | Myers .................................. 119/159 |
| 4,126,104 | 11/1978 | Overby ............................... 119/159 |
| 4,379,440 | 4/1983 | Thedford et al. ................... 119/159 |
| 4,443,387 | 4/1984 | Gordon ................................ 261/30 |
| 4,476,809 | 10/1984 | Bunger ................................. 119/16 |
| 4,510,889 | 4/1985 | Jobe .................................... 119/159 |
| 4,693,852 | 9/1987 | Gordon ................................ 261/30 |

Primary Examiner—Robert P. Swiatek
Attorney, Agent, or Firm—Zarley, McKee, Thomte, Voorhees & Sease

[57] ABSTRACT

The method and apparatus of the present invention for cooling livestock includes a liquid storage tank which can be carried upon the vehicle transporting the livestock. The storage tank includes a pump having a plug adapted to be fitted within the cigarette lighter receptacle of the vehicle. A conduit leads from the pump to the livestock compartment where the livestock are being carried. Spray heads are contained within the livestock compartment, and actuation of the pump causes the sprays to spray cooling liquid on the livestock.

2 Claims, 1 Drawing Sheet

U.S. Patent     Nov. 27, 1990     4,972,803
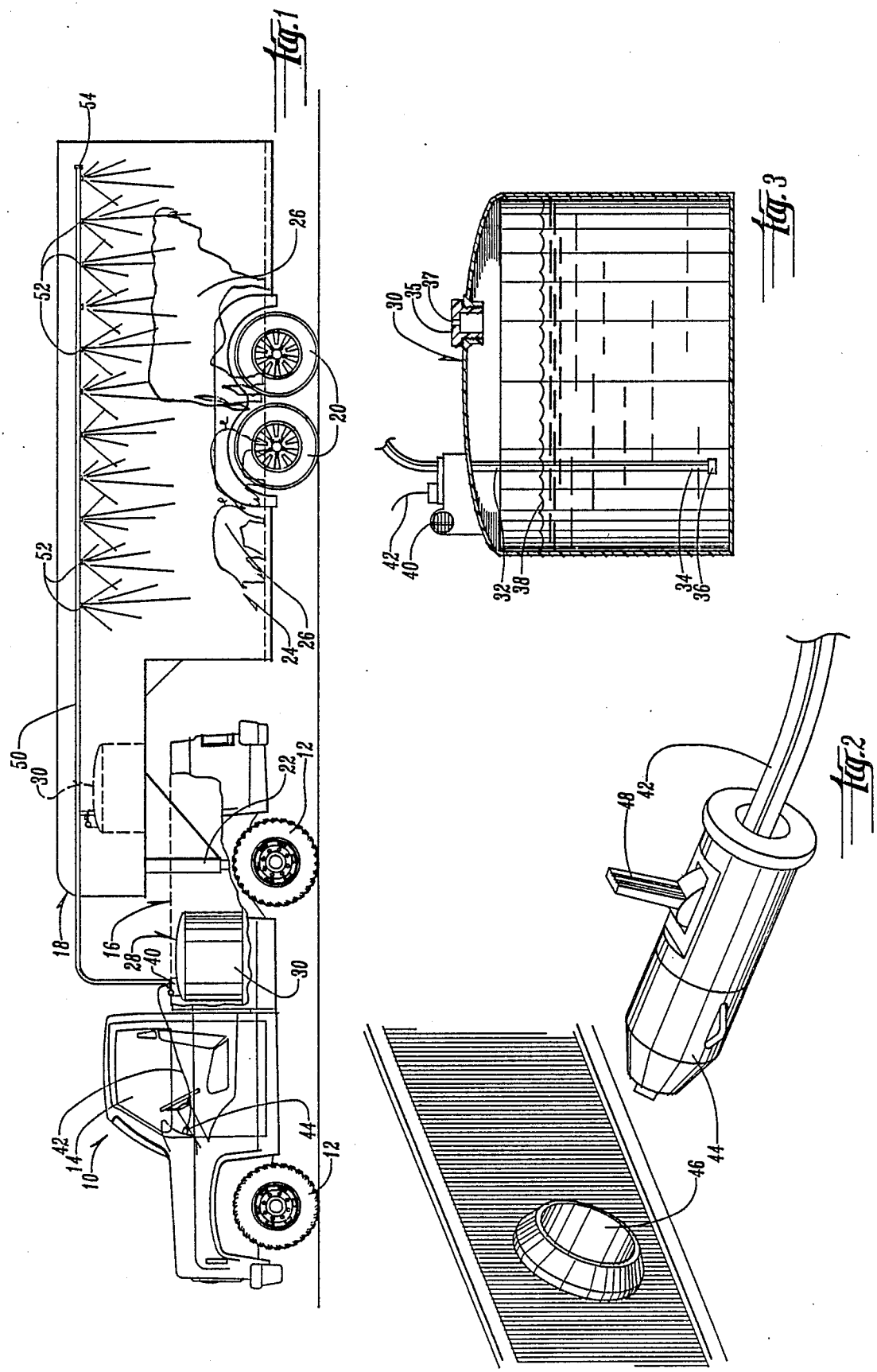

METHOD AND APPARATUS FOR COOLING LIVESTOCK

BACKGROUND OF THE INVENTION

This invention relates to a method and apparatus for cooling livestock.

Livestock are often transported from the farm to the market in trucks or trailers. The transporting process places the livestock under considerable stress, and often results in weight loss and sometimes in the death of some of the livestock. This is particularly true during hot weather when the livestock become overheated during transporting.

Therefore, a primary object of the present invention is the provision of a method and apparatus for cooling the livestock during the time they are being transported from the farm to the market. A further object of the present invention is the provision of an improved method and apparatus for cooling livestock, wherein the device can be mounted in existing transporting vehicles.

A further object of the present invention is the provision of an improved method and apparatus for cooling livestock which minimizes losses due to weight shrinkage and death of the livestock during transporting.

A further object of the present invention is the provision of a method and apparatus for cooling livestock which permits the driver of a vehicle to selectively operate the cooling apparatus for cooling the animals.

A further object of the present invention is the provision of a method and apparatus for cooling livestock which is efficient in operation, durable in use, and economical to manufacture.

BRIEF DESCRIPTION OF THE INVENTION

The present invention utilizes a water tank which can be stored either in the livestock compartment or in the truck box of a truck pulling a trailer. A pump is connected to an outlet pipe within the storage tank and includes a cord which is adapted to be plugged into the cigarette lighter receptacle of the vehicle. The pump draws the cooling liquid from the storage tank through the outlet pipe of the storage tank. An elongated conduit is connected to the pump and includes one or more spray heads which are mounted within the livestock compartment. When the pump is actuated, it forces cooling fluid out through the spray heads onto the animals in the livestock compartment, thereby cooling the animals.

The operator of the vehicle can control the spraying of the animals by means of a switch which is mounted on the plug plugged into the cigarette lighter receptacle. When the driver wishes to cool the animals, he merely flips the switch and the spray is sprayed onto the animals. This gives the driver control over the timing of the cooling action, and minimizes the amount of liquid that need be stored in the storage tank.

BRIEF DESCRIPTION OF THE DRAWINGS

FIG. 1 is a sectional elevational view of the device mounted within a livestock trailer and truck.

FIG. 2 is an enlarged perspective view of the plug which is inserted into the cigarette lighter receptacle.

FIG. 3 is a sectional view of the storage tank of the present invention.

DETAILED DESCRIPTION OF THE PREFERRED EMBODIMENT

Referring to the drawings, the numeral 10 generally designates a conventional pickup truck. Truck 10 includes ground engaging wheels 12, a passenger compartment 14, and a truck box 16. Coupled to truck 10 is a livestock trailer 18 having ground engaging wheels 20 and a gooseneck hitch 22 connected to the floor of truck box 16. Within trailer 18 is a livestock compartment 24 containing various livestock 26.

The numeral 28 generally designates the cooler assembly of the present invention. Cooler assembly 28 includes a storage tank 30 having an outlet pipe 32. The lower open end 34 of outlet pipe 32 has a screen 36 thereon and is located adjacent the bottom of the container or storage tank 30. Tank 30 is filled with a cooling liquid 38, which is preferably water. A filler cap 35 is provided for filling tank 30 with water, and includes a vent hole 37.

Cooler assembly 28 also includes a pump 40 which is mounted on storage tank 30 and which is connected to outlet pipe 32 for drawing water from storage tank 30. An electric cord 42 leads from pump 40 and includes a plug 44 at the end thereof. Plug 44 is shaped to be matingly received within the cigarette lighter receptacle 46. A switch 48 is contained on plug 44 and is movable from an open position preventing electrical current from being delivered to pump 40 to a closed position permitting electrical current to be delivered to pump 40 for actuating the pump 40.

An elongated conduit 50 is located within the livestock compartment 24, and extends outwardly therefrom where it is connected to pump 40. One or more spray heads 52 are connected to conduit 50 along its length, and are adapted to spray fluid downwardly onto the animals located within the livestock compartment 24. An end cap 54 closes off the end of conduit 50. Preferably the conduit 50 and the spray heads 52 are located in the upper portion of the livestock compartment 24 so that they can spray downwardly on the animals.

In operation the storage tank 30 is placed in the truck box 16 of truck 10. It is also possible to place this tank within the front portion of trailer 18 as shown in shadow lines in FIG. 1. The plug 44 is inserted into the cigarette lighter receptacle 46 within the passenger compartment 14 of truck 10. The conduit 50 is inserted into the livestock compartment 24 as shown in FIG. 1.

During transporting, the driver of the vehicle can move switch 48 from its open to its closed position, thereby actuating pump 40 and causing liquid to be drawn out of tank 30 through pipe 32, and to be forced through conduit 50 to spray heads 52 where it is sprayed on the animals within the passenger compartment 24. The operator of the vehicle can turn the switch on and off as desired so as to insure that a cooling liquid is provided for the animals when needed. The cooling liquid keeps the animals cool and reduces weight shrinkage or even possible death of the livestock. The cooling assembly 28 is compact and can be easily transported or packaged for sale. It can be quickly and easily mounted in any conventional livestock carrying vehicle. While the device is shown mounted in a truck-trailer combination, it is also possible to mount it in a livestock truck or other type of vehicle used for carrying livestock. Thus, it can be seen that the device accomplishes at least all of its stated objectives.

I claim:

1. Apparatus for cooling livestock, said apparatus comprising:

a vehicle having an operator's cab and a livestock carrying compartment, said operator's cab having a cigarette lighter receptacle;

a portable liquid storage tank having a top wall, side walls, and a bottom wall and being mounted on said vehicle;

an outlet pipe having an upper end outside said tank and a lower end extending within said tank adjacent said bottom wall thereof;

a cooling liquid stored within said tank; and electrical suction pump means mounted on said top wall of said storage tank and connected to said upper end of said outlet pipe for drawing said cooling liquid out of said tank;

a power cord having a first end connected to said pump and a second end, said second end of said cord having a plug which is matingly fitted into said lighter receptacle for receiving electrical power therefrom;

at least one sprayer head located within said livestock carrying compartment;

conduit means connecting said pump to said at least one sprayer head;

switch means on said plug for selectively activating said pump means whereby said pump means draws said cooling fluid out of said tank and forces said cooling fluid through said conduit and said at least one sprayer head for spraying said fluid into said livestock carrying compartment.

2. A method for cooling livestock in a livestock compartment being transported by a vehicle, said vehicle having a vehicle cab and a cigarette lighter receptacle in said cab, said method comprising:

storing liquid in a portable suction liquid storage tank mounted on said vehicle;

connecting a suction pump to said storage tank for drawing said liquid therefrom, said suction pump being connected to an outlet pipe having a lower end extending within said storage tank adjacent the bottom wall thereof, said suction pump having a power cord connected thereto said power cord having a plug on one end thereof and being connected to said pump at the other end thereof;

connecting at least one sprayer head within said compartment to said pump;

plugging said plug into said cigarette lighter receptacle for actuating said pump to draw said liquid out of said tank and to force said liquid through said at least one sprayer head onto said livestock within said storage compartment;

turning a control switch on said plug from an open position to a closed position for actuating said pump selectively whereby said pump, when actuated, will pump cooling liquid from said tank to said at least one sprayer head for cooling animals within said compartment.

* * * * *